| United States Patent [19] | [11] Patent Number: 5,059,731 |
|---|---|
| Berrebi | [45] Date of Patent: Oct. 22, 1991 |

[54] PROCESS OF REDUCTION OF A REFINING CATALYST BEFORE ITS USE

[75] Inventor: Georges Berrebi, Bourg Les Valence, France

[73] Assignee: Europeene De Retraitement De Catalyseurs Eurecat, La Voulte Sur Rhone, France

[21] Appl. No.: 475,520

[22] Filed: Feb. 6, 1990

[30] Foreign Application Priority Data

Feb. 7, 1989 [FR] France ................................ 89 01662

[51] Int. Cl.$^5$ ........................ C07C 5/08; C10G 45/34; B01J 37/16; B01J 23/40
[52] U.S. Cl. .................................... 585/259; 208/259; 502/224; 502/230; 585/260; 585/261
[58] Field of Search ........................ 585/259, 260, 261

[56] References Cited

U.S. PATENT DOCUMENTS

| 3,674,888 | 7/1972 | Derrien et al. | 585/260 |
| 3,770,619 | 11/1973 | Derrien et al. | 585/273 |
| 4,208,271 | 6/1980 | Cosyms et al. | 208/255 |
| 4,347,392 | 8/1982 | Cosyms et al. | 585/259 |
| 4,490,481 | 12/1984 | Boitiaux et al. | 502/330 |
| 4,533,779 | 8/1985 | Boitiaux | 502/330 |

*Primary Examiner*—Paul E. Konopka
*Attorney, Agent, or Firm*—Millen, White & Zelano

[57] ABSTRACT

The invention relates to a process of reduction of a refining catalyst before its use, the catalyst containing a support and an active phase with a base of at least one noble or nonnoble metal of Group VIII or Group Ib of the periodic table, the process consisting in:
 a) impregnating the catalyst with an aqueous or organic solution of a reducing agent compound,
 b) breaking down the reducing agent compound by heating the catalyst;
 c) drying the catalyst thus obtained.

The invention is characterized in that a halogen additive is added with the reducing agent.

The catalyst thus treated is particularly suitable, for example, for selective hydrogenation of unsaturated hydrocarbons.

6 Claims, No Drawings

PROCESS OF REDUCTION OF A REFINING CATALYST BEFORE ITS USE

The invention relates to a pretreatment of refining catalysts whether they are in a new condition or come from a regeneration or activation or reactivation unit.

Some refining catalysts must generally be presulfurized and optionally reduced in the presence of hydrogen before being able to be used or reused in hydrocarbon conversion reactions, i.e., before being put in contact with the hydrocarbons or charge of hydrocarbons to be treated. This is particularly the case of hydrodesulfuration catalysts.

Other catalysts must be reduced only with hydrogen before being used or reused in hydrocarbon conversion reactions, i.e., before being put in contact with the hydrocarbons or charge of hydrocarbons to be treated. This is particularly the case of hydrogenation catalysts of olefin cuts coming from steam cracking. Such catalysts do not generally have to be presulfurized, the sulfur rather being a poison of this type of catalyst.

The invention relates to a particular method of reduction of this second class of catalysts which generally contain a support and an active phase with a base of at least one metal of Group VIII of the periodic table, this metal being either a noble metal of the platinum family (platinum, palladium, ruthenium, iridium, rhodium and osmium) or a nonnoble metal of this Group VIII, namely, iron, cobalt and nickel, and/or with a base of at least a metal of Group IB, namely, copper or silver or gold.

The invention is an improvement of the European patent application of the applicant 88 400 695.8 of Mar. 23, 1988 in which the process consists in performing the reduction of the catalyst (either outside the refining reactor, i.e.,. "ex situ," on inside the refining reactor, i.e., "in situ") in three stages:

a) in a first stage the catalyst is impregnated between 0 and 50° C., preferably between 0 and 40° C. and more particularly between 10 and 30° C. or at ambient temperature, with an impregnation solvent, which is an aqueous or organic solvent of a compound that is a reducing agent selected from the group consisting of aldehydes containing 2 to 14 carbon atoms per molecule (and preferably 3 to 12 carbon atoms), the ketones or polyketones containing 3 to 18 (and preferably 3 to 12) carbon atoms per molecule, ethers containing 2 to 14 (preferably 3 to 12) carbon atoms per molecule, alcohols or polyalcohols containing 1 to 14 (preferably 2 to 12) carbon atoms per molecule and organic acids or polyacids containing 1 to 14 (and preferably 1 to 12) carbon atoms per molecule, so as to introduce 10 ppm at 100% (by weight), preferably 10 ppm at 50%, or more particularly 1000 ppm at 10% of this compound on the catalyst.

b) in a second stage the temperature of the catalyst thus impregnated is raised to a temperature between 100 and 150° C. and under a pressure of 1 to 10 bars (preferably 1.2 to 5 bars and more particularly 2 to 4 bars, for example 3.5 bars) so as to cause a cracking or a decomposition of the reducing agent compound. This cracking or this decomposition is reflected by the formation, essentially, of carbon monoxide which will cause the reduction of the catalyst and cause the suitable distribution of the active phase on the catalyst. This cracking or decomposition also causes the formation of steam.

c) in a third stage, the catalyst is dried to eliminate the impregnation solvent and the water formed in step (b).

The impregnation solvent is generally water or any suitable organic solvent in which the reducing agent compound, different from the solvent selected, is soluble. There can be cited alcohols, ethers, etc.

Some examples of reducing agent compounds are cited below:

As aldehydes, there can be cited, for example: ethanal, propanal, butanal, 2-ethyl butanal, 2-phenoxy propanal, 3-methyl butanal, 2-methyl pentanal, 2-ethyl hexanal, heptanal, octanal, nonanal, decanal, dodecanal, dimethyl acetal dodecanal, etc.

As ketones there can be cited, for example: acetone, 2-butanone, 3-methyl 2-butanone, 2-pentanone, 3-pentanone, 2-hexanone, 3,3-dimethyl 2-hexanone, 3,4-dimethyl 2-hexanone, 3-hexanone, 3,4-dimethyl 3-hexanone, 2,5-dimethyl 3-hexanone, 4,4-dimethyl 3-hexanone, 3-methyl 2-hexanone, 4-methyl 2-hexanone, 5-methyl 2-hexanone, 4-methyl 3-hexanone, 5-methyl 3-hexanone, 1-phenyl 1-hexanone, 2-heptanone, 3-heptanone, 4-heptanone, 2,6-dimethyl 4-heptanone, isopropyl 2-heptanone, 3-methyl 2 heptanone, 6-methyl 3-heptanone, 2-methyl 4-heptanone, 1-phenyl 1-heptanone, 2-octanone, 3-octanone, 4-octanone, 7-methyl 4-octanone, 2-nonanone, 4-nonanone, 5-nonanone, 2-decanone, 3-decanone, 4-decanone, 2-dodecanone, 1-phenyl, 1-dodecane.

Unsaturated aldehydes or ketones can be used. There can be cited as examples, 2-butenal, 2-hexanal, 3-penten-2-one, 1-pentene 5,5-dimethyl 1-phenyl-3-one, 3-hepten-2-one, 5-hepten-2-one 6-methyl.

As polyketones there can be used, for example, 2,3-butanedione (dimethylglyoxal); 2,3-pentadione; 2,4-pentadione(acetylacetone); 3,3-dimethyl 2,4-pentadione; 3-ethyl 2,4-pentadione; 2,5-hexanedione; 1,6-diphenyl 1,6-hexanedione; 2,2,5,5-tetramethyl 3,4-hexadione; 2,4-heptanedione; 2,4,6-heptanetrione; 2,3-octanedione; 2,7-octanedione; 3,6-octanedione; 4,5-octanedione; 2,2,7,7-tetramethyl 3,6-octanedione; 1,4-diphenyl 2-butene-1,4-dione (ethylene diketone), etc.

As ether, there can be cited for example: dimethyl ether, diethyl ether, methyl ethyl ether, methyl butyl ether, methyl t-butyl ether, 2-methyl ethyl hexyl ether, ethyl butyl ether, ethyl t-butyl ether, di n-propyl ether, isoamyl ether, furan, tetrahydrofuran, dioxane, etc.

As alcohols, there can be cited, for example: methanol, ethanol, propanol, n-butanol, isobutanol, 1-pentanol, 2-pentanol, 2-methyl 4-butanol, 2-methyl 3-butanol, hexanols, methyl pentanols, dimethyl butanols, heptanols, octanols or amyl alcohols $C_5H_{11}OH$.

As acids, there can be cited, for example, those that correspond to aldehydes, ketones and/or the above-named alcohols. Lactic acid or citric acid, formic acid, propionic acid can be cited.

The process can be performed "in situ" or "ex situ." The catalyst, reduced by the methods not exhibiting any danger (eliminated hydrogen handling) is then delivered to the refiner completely ready for use, thus freeing the refiner from the delicate and restricting operations as explained above. Thus it is possible for the refiner to eliminate the reduction operation from his catalysts, even possibly his catalytic reforming catalysts if this is considered useful.

The invention relates to the introduction of at least one additive with a base of a halogen during the first stage of the process.

The process of introduction of the additive is characterized in that during the first stage there is added by weight (weight expressed in halogen), relative to the weight of the reducing agent, 0.1 to 10%, preferably 1 to 6% and more particularly 2 to 5%, of at least one additive selected from the group consisting of halogens or halogen compounds.

The additive or additives can be added, for example, with the solution of the reducing agent or agents used either in the pure state or dissolved in a suitable solvent, such as alcohols or ethers, etc.

The organic halogen compound or compounds according to the invention can be used in another suitable solvent such as, for example, water, alcohols (methanol, ethanol, propanol, etc.) or other mineral or organic liquids known for dissolving the additives chosen and if the solvent chosen is compatible with the other products or solvents used in the process.

As a halogen additive, chlorine, bromine, fluorine and iodine, hydrochloric acid, hydrobromic acid, hydrofluoric acid, hydroiodic acid or any other halogen compound, for example a compound chosen from the group consisting of halogens of hydrocarbylaluminum of general formula Al $R_x X_y$ where R represents a hydrocarbon group containing for example up to 12 carbon atoms such as alkyl, aryl, aralkyl, alkaryl, cycloalkyl, X representing a halogen (chlorine or bromine in particular) and x having a value from 1 to 1.5, y having a value from 1.5 to 2, preferably with $x=1$, $y=2$, with $x+y=3$ (as examples of such compounds, ethylaluminum sesquichloride, dichloroethylaluminum, dichloroisobutylaluminum and dibromomethylaluminum can be mentioned in particular) advantageously will be used. Halocarboxylic acids of formula R1 COOH in which R1 is a halogen alkyl radical also can be used, particularly those which contain at least one halogen atom in alpha position of the COOH group with, on the whole, 2 to 10 carbon atoms per molecule. A class of acids able to be used includes the halocarboxylic acids of formula R'1 COOH in which R'1 is a haloalkyl radical containing 1 to 3 carbon atoms, of formula Cm Hp Xq where X is a halogen (fluorine, chlorine, bromine, iodine), $m=1$, 2 or 3, p is equal to zero or an integer, q is an integer, provided for example that $p+q=2m+1$. A halocetic acid of formula R2 COOH in which R2 is a halomethyl radical of formula $CX_n H_{3-n}$ where X is fluorine, chlorine, bromine or iodine with n from 1 to 3 also will be used in particular. There can be mentioned as usable acids: trifluoroacetic, difluoroacetic, monofluoroacetic, trichloroacetic, dichloroacetic, monochloroacetic, tribromoacetic, dibromoacetic, monobromoacetic, triiodoacetic, diiodoacetic, monoiodoacetic, pentafluoropropionic, fluoro-2-propionic, dichloro-2-propionic, chloro-2-propionic, heptafluorobutyric, fluoro-2-butyric or chloro-2-butyric acids. The preceding examples are not limiting.

Halides of alkyl, aryl, alkylaryl and aralkyl with alkyl radical containing for example 1 to 6 carbon atoms per molecule also can be used: there can be mentioned methyl chloride, methylene chloride, chloroform, carbon tetrachloride, dichloroethane etc. Various halogen compounds, for example thionyl chloride, nitrosyl chloride, hexafluoroacetylacetone, 2-thenoyltrifluoroacetone-TTA, trifluoroacetylacetone also can be used. Also to be cited as nonlimiting examples are alpha-chloralose, beta-chloralose, chloramine-B hydrate, chloramine-T hydrate, chloramphenicol, tetrachlorobenzoquinone, chloroacetaldehyde, chloroacetaldehyde diethyl acetal, chloroacetaldehyde dimethyl acetal, 2-chloroacetamide, chloroaceton, chloroacetonitrile, 2-chloroacetophenone, 2'-chloroacetophenone, 3'-chloroacetophenone, 4'-chloroacetophenone, chloroacetyl chloride, 2-chloroacrylonitrile, 2-chloroaniline, 3-chloroaniline, 4-chloroaniline, 3-chloroanisole, 4-chloroanisole, 1-chloroanthracene, 2-chloroanthracene, 2-chlorobenzaldehyde, 4-chlorobenzaldehyde, chlorobenzene, 4-chlorobenzenesulfonamide, 2-chlorobenzoic acid, 2-chlorobenzoic hydrazide, 4-chlorobenzoic hydrazide, 2-chlorobenzonitrile, 3-chlorobenzonitrile, 4-chlorobenzonitrile, 2-chlorobenzophenone, 3-chlorobenzophenone, 4-chlorobenzophenone, 2-chlorobenzothiazole, 4-chlorobenzotrichloride, 2-chlorobenzotrifluoride, 4-chlorobenzotrifluoride, 2-chlorobenzoyl chloride, 3-chlorobenzoyl chloride, 4-chlorobenzoyl chloride, 4-chlorobenzylamine, 2-chlorobenzyl bromide, 3-chlorobenzyl bromide, 2-chlorobenzyl chloride, 2-chlorobenzyl chloride, 4-chlorobenzyl chloride, 2-chlorobenzyl cyanide, 3-chlorobenzyl cyanide, 4-chlorobenzyl cyanide, 2-(4-chlorobenzyl) pyridine, 4-(4-chlorobenzyl) pyridine, 1-chlorobutane, 2-chlorobutane, 4-chloro-1-butane, 3-chloro-2-butanone, 2-chloro-2-butene, 4-chlorobutyric acid, 4-chlorobutyronitrile, 4-chlorobutyrophenone, 4-chloro-2-butyrothienone, 4-chlorobutyrothienone, 4-chlorobutyryl chloride, 3-chloro-2-chloromethyl-1-propene, 2-chlorocinnamic acid, 3-chlorocinnamic acid, 2-chlorocyclohexanol, 1-chlorodecane, 4-chloro-2,6 diaminopyride, chlorofluoroacetic acid, 1-chloro-2,4-dinitrobenzene, 1-chloro-3,4-dinitrobenzene, 2-chloroethanesulfonic acid, 2-chloro-1-ethanesulfonyl chloride, 2-chloroethanol, 2(2-chloroethoxy)ethanol, N(2-chloroethyl)acetamide, chloroethylene carbonate, 2-chloroethyl ether, 3-chloro-4-fluoroaniline, 4-chloro-2-fluoroaniline, 2-chloro-6-fluorobenzal chloride, 2-chloro-6-fluorobenzaldehyde, 1-chloro-3-fluorobenzene, 2-chloro-6-fluorobenzyl alcohol, 2-chloro-6-fluorophenylacetic acid, 2-chloro-6-fluorophenylacetonitrile, 2-chloro-4-fluorotoluene, 2-chloro-6-fluorotoluene, 4-chloro-2-fluorotoluene, 1-chloroheptane, 1-chlorohexadecane, 1-chlorohexane, 6-chloro-1-hexanol, chlorohydroquinone, 5-chloro-2-hydroxyaniline, 5-chloro-2-hydroxybenzamide, chloro-2-iodobenzene, chloroiodomethane, 3-chloro-2-methylaniline, 3-chloro-4-methylaniline, 4-chloro-2-methylaniline, 3-chloro-3-methylpentane, 4-chloro-3-methylphenol, 2-chloro-2-methylpropane, 4-chloro-2-methythiopyrimidine, 1-chlorooctadecane, 1-chlorooctane, 3-chloro-2,4-pentanedione, 1-chloro-3-pentanone, 5-chloro-2-pentanone, 2-chlorophenol, 3 -chlorophenol, 4-chlorophenol, 1-chloropropane, 2-chloropropane, 3-chloro-1,2-propanediol, 2-chloro-1-propanol, 3-chloro-1-propanol, chloropropene, 3-chloropropenic acid, 3-chloropropionyl chloride, 3-chloropropyl acetate, 5-chlorosalicylic acid, chlorotetradecane, 4-chlorothiophenol, 2-chlorotoluene, 3-chlorotoluene, 4-chlorotoluene, 2-chloro-m-xylene, 2- chloro-p-xylene, 4-chloro-o-xylene and chlorosulfonic acid.

Also to be cited, as an indication, o-aminobenzofluoride, m-aminobenzofluoride, p-aminobenzofluoride, 3-amino-4-chlorobenzotrifluoride, 5-amino-2-chlorobenzotrifluoride, benzoyl-1,1,1-trifluoroacetone, o-bromobenzotrifluoride, m-bromobenzotrifluoride, p-bromobenzotrifluoride, bromochlorodifluoromethane, 1-bromo-2,4-difluorobenzene, o-bromofluorobenzene, m-bromofluorobenzene, p-bromofluorobenzene, carbonyl fluoride, trifluoride chloride, o-chlorobenzotrifluoride, m-chlorobenzotrifluoride, p-chlorobenzotrifluoride, chlorofluoroacetamide, 1-chloro-1,1-difluoroethane, 3-chloro-4-fluoronitrobenzene, 2-chloro-5-nitrobenzotrifluoride, chloropentafluorobenzene, chlorotrifluoroethylene, dibromodifluoromethane, dibromofluoromethane, 1,2 dibromohexafluoropropane, 3,4-dichlorobenzotrifluoride, difluoroacetic acid, 2,4-difluoroaniline, 2,5-difluoroaniline, 2,6-difluoroaniline, o-difluorobenzene, m-difluorobenzene, p-difluorobenzene, 1,1-difluoroethylene, 1,2-difluorotetrachloroethane, 2,4-dinitrofluorobenzene, ethyltrifluoroacetate, p-fluoroacetophenone, o-fluoroaniline, m-fluoroaniline, p-fluoroaniline, o-fluorobenzaldehyde, m-fluoroaldehyde, p-fluorobenzaldehyde, fluorobenzene, o-fluorobenzoic acid, p-fluorobenzoic acid, m-fluorobenzotrifluoride, o-fluorobenzoyl chloride, m-fluorobenzoyl chloride, 4- fluoro-2-methylaniline, p-fluoronitrobenzene, 4 fluoro-2-nitrotoluene, o-fluorophenol, m-fluorophenol, p-fluorophenol, p-fluoropropiophenone, o-fluorotoluene, m-fluorotoluene, p-fluorotoluene, hexafluoro-2-butyne, p-fluoronitrobenzene, 4-fluoro-2-nitrotoluene, o-fluorophenol, m-fluorophenol, p-fluorophenol, p-fluoropripiophenone, o-fluorotoluene, m-fluorotoluene, p-fluorotoluene, hexafluoro-2-butyne, hexafluoroethane, hexafluoropropene, methylfluoride, 1,1,2-trichlorotrifluoroethane, 1,1,1-trifluoroacetone, 2,2,2-trifluoroethanol, trifluoromethanesulfonic acid, m-trifluoromethylbenzaldehyde, p-trifluoromethylbenzaldehyde, o-trifluoromethylbenzaldehyde acid, trifluoromethylbromide and trifluoromethyliodide. This list is not limiting.

The catalysts that can be treated according to the invention can be used, for example, for selective hydrogenation of unsaturated hydrocarbons, particularly those that contain 3 to 10 carbon atoms per molecule. Here, the catalysts advantageously contain nickel or noble metals such as palladium. This type of process is described in the patent U.S. Pat. No. 3,674,888. The catalyst preferably has a base of palladium or of a palladium compound deposited on alumina.

The selective hydrogenation treatment can preferably be performed at a temperature between 0 and 80° C. under a sufficient pressure to maintain a liquid phase, and usually between 1 and 25 bars. The molar ratio hydrogen/unsaturated hydrocarbon is usually between 1 and 5 (preferably between 1 and 2). The hourly output of charge is advantageously between 2 and 50 (preferably between 10 and 25) liquid volumes per volume of catalyst.

Such a process makes it possible, for example, to hydrogenate acetylene and/or diolefin hydrocarbons without appreciable hydrogenation of the monoethylene hydrocarbons. It also makes it possible to hydrogenate acetylene and 1,2-butadiene hydrocarbons without appreciable hydrogenation of the 1,3-butadiene.

U.S. Pat. No. 4,347,392 also describes refining operations using catalysts that will be able to be treated according to the invention. Thus, to be more precise, in the refining operations using such catalysts it can be mentioned that these operations have the object of selective hydrogenation of impurities of an ethylene and/or propylene cut.

The processes of conversion of hydrocarbons at high temperature such as, for example, steam cracking, produce unsaturated hydrocarbons such as, for example, ethylene, propylene, butadiene, butenes, as well as hydrocarbons boiling in the range of gasolines; monoolefin gaseous hydrocarbons with two or three carbon atoms obtained by this process also contain a certain amount of hydrocarbons with a greater degree of unsaturation. The content of these hydrocarbons varies as a function of the severity of the conversion treatment but it is always too small to consider separating them and using them as such for petrochemistry. However, their presence along with monoolefin hydrocarbons makes it difficult, even impossible, to use these latter for petrochemistry. This is the case for the ethylene cut or the propylene cut from which the acetylene or propyne and propadiene should be eliminated as completely as possible.

To obtain pure propylene, the known processes aim at hydrogenating as selectively as possible the propyne and propadiene of the C3 cut. A typical charge coming from steam cracking contains by weight 2 to 5% of propane, 90 to 95% of propylene, 2 to 3% of propyne and 1 to 2% of propadiene.

The purity of the propylene required for later petrochemical uses usually corresponds to less than 10 ppm of the sum propyne + propadiene. Further, it is desired that the propylene yield should be at least equal to 100% and more generally be greater than this value to the extent that propyne and propadiene are selectively hydrogenated into propylene.

Here a selective hydrogenation catalyst should have two essential qualities: a great selectivity to hydrogenate selectively acetylene, allene and diolefin impurities while avoiding unwanted hydrogenation reactions of the monoolefins and polymerization, which cause not only a reduction of the yield but also cause a deactivation of the catalyst.

The catalysts most generally used so far consist of palladium deposited on an alumina or silica support.

The selective hydrogenation can be performed at a temperature from about 0 to 160° C. It is possible to operate in the gaseous phase or liquid phase. In the latter case, applicable in particular to a C3 cut, the pressure should be sufficient to maintain a liquid phase and preferably the operation is performed at 0-80° C. under 10 to 40 bars, at a liquid output of 2 to 50, preferably 10 to 30, volumes per volume of catalyst and per hour. In the gaseous phase, the output of the C2 and/or C3 cut (VVH gas) is, for example, from 500 to 20,000 volumes per volume of catalyst and per hour and a pressure, for example, of 5 to 30 bars.

The catalysts treated according to the invention are also suitable in selective hydrogenation processes of a gasoline containing both gum-generating compounds and undesirable sulfur compounds, in particular mercaptans and/or hydrogen sulfide as explained in U.S. Pat. No. 4,208,271 and in U.S. Pat. No. 3,770,619.

These conventional conditions are well known. They include particularly the following conditions, given by way of nonlimiting example:

temperature: 30–250° C., preferably 50–200° C.;
total pressure: 10–100 bars, preferably 20–50 bars;
space velocity or ratio of the volume of liquid charge (gasoline) to the volume of the catalyst per hour (VVH) 0.5–10, preferably 2–5;
molar ratio hydrogen/charge (gasoline): 0.1 to 2, preferably 0.5 to 1.5.

The preferred catalyst supports are the so-called neutral supports, i.e. those that exhibit only a slight to zero acidity, said acidity being measured, for example, by the ammonia absorption test (Journal of Catalysis,2, 211-222, 1963).

In U.S. Pat. No. 3,770,619, a similar process was proposed for the purification of pyrolysis gasoline consisting essentially of hydrocarbons having 5 to 10 carbon atoms per molecule and used for selective hydrogenation of diolefins and alkenyl aromatics and optionally for a more thorough hydrogenation of the charge also comprising a partial hydrogenation of the olefins.

In the process applied to pyrolysis gasolines and using at least two reaction zones, the major operating temperatures, which are slightly different in each of the two reaction zones, will be between 20 and 180° C. and advantageously between 60 and 120° C. The pressures applied in the first reaction zone are between 5 and 50 and preferably between 15 and 35 bars, in the second reaction zone the pressures are between 30 and 80 and preferably between 35 and 60 bars.

In the following examples, the effect of the method with the addition of halogen compounds will be studied.

EXAMPLE 1

In a first test, alumina agglomerates are prepared as follows: wet alumina is agglomerated in a groove to transform it into balls 2 to 6 mm in diameter. These balls are treated with water at 190° C. for 6 hours, then roasted at 800° C. for 4 hours. The balls are impregnated with an aqueous solution at 5% by weight of palladium nitrate, in an amount sufficient to deposit 1% by weight of palladium relative to the dry alumina.

The catalyst is dried, roasted at 450° C. for 2 hours, then is reduced with an aqueous solution of formic acid: the catalyst is impregnated with this solution, at 20° C., under atmospheric pressure, so that the catalyst contains 2% by weight of formic acid. Then the temperature of the catalyst is raised to 120° C. under a pressure of 3 bars and it is kept under these operating conditions for 2 hours. Then the catalyst is dried. A catalyst not according to the invention is obtained which has a specific surface area of 60 m²/g and a pore volume of 0.58 cm³/g.

This catalyst is used to hydrogenate a C4 cut at 15° C., under 15 bars of total pressure, with a molar ratio H2/impurities of 3 and an hourly output of 25 liquid volumes per volume of catalyst.

The C4 cut contained 5% of saturated hydrocarbons, 5% of monoolefin hydrocarbons, 43.5% of 1-3-butadiene and 0.5% of acetylene hydrocarbons (methylacetylene, ethylacetylene and vinylacetylene). The following relative percentages of hydrogenation were obtained (table I):

TABLE I

| | Conversion % mol. |
|---|---|
| Monoolefins | 0 |
| Butadiene | 1 |
| Acetylenes | 98.0 |

In a second test, the procedure is as in example 1. However, here the catalyst is impregnated with a reducing agent in the presence of halogen additives.

3% by weight of additive relative to the reducing agent is used.

Table II below gives the results obtained with these additives.

TABLE II

| ADDITIVES | $CH_2FCOOH$ | $CHCl_2COOH$ | $CH_2ClCOOH$ | $CBr_3COOH$ |
|---|---|---|---|---|
| Conversion % mol | | | | |
| Monoolefins | 0 | 0 | 0 | 0 |
| Butadiene | 1 | 1 | 1 | 1 |
| Acetylenes | 98.1 | 98.2 | 98.1 | 98.2 |

| ADDITIVES | $CH_2BrCOOH$ | $CH_2ICOOH$ | $C_3F_7COOH$ |
|---|---|---|---|
| Conversion % mol | | | |
| Monoolefins | 0 | 0 | 0 |
| Butadiene | 1 | 1 | 1 |
| Acetylenes | 98.1 | 98.1 | 98.2 |

EXAMPLE 2

In a first test, a catalyst is prepared by impregnating, with a nitric solution of palladium nitrate, an alumina support, of balls 2 mm in diameter, with a specific surface area equal to 57 m2/g and a total pore volume equal to 0.6 cm³/g, so as to obtain on the finished catalyst, a palladium content of 0.3% by weight. After impregnation, the catalyst is dried at 120° C. in an oven then roasted at 900° C. for two hours in an air current. The catalyst is charged in a tube reactor.

Then the catalyst is subjected to the following process:

The catalyst is treated in situ with an aqueous solution of propionic acid; the impregnation is performed at 20° C. under atmospheric pressure so that the catalyst contains 2% by weight of propionic acid. The temperature of the catalyst is raised to 130° C. under a pressure of 3.5 bars and these operating conditions are maintained for two hours. Then the catalyst is dried.

A sample of the catalyst is examined by electron microscopy. An average size of the palladium crystallites of 80A° is found.

To hydrogenate acetylenes and diolefins without appreciable hydrogenation of monoethylene hydrocarbons, the following operating conditions are followed:
space velocity (liquid VVH)=20
pressure=20 bars
temperature=20° C.
H2/propyne + propadiene=1.1 mol/mol.

Analyses of the charge and product obtained are summarized in following table III:

TABLE III

| Compounds | Charge % weight | Product % weight |
|---|---|---|
| Propane | 4.0 | 6.2 |
| Propylene | 91.5 | 93.65 |
| Propyne | 2.7 | undetectable |
| Propadiene | 1.8 | about 8 ppm |
| Oligomers | — | 0.15 |

TABLE III-continued

| Compounds | Charge % weight | Product % weight |
|---|---|---|
| TOTAL | 100 | 100 |

In a second test, the operation is as in the first test. However, according to the invention, the impregnation of the reducing agent is performed in the presence of 2% by weight, relative to the reducing agent, of a halogen additive which is $C_3F_7COOH$.

By using the same charge as in the first test, the product obtained has the following composition given in Table IV.

TABLE IV

| | % weight |
|---|---|
| propane | 6.20 |
| propylene | 93.70 |
| propyne | undetectable |
| propadiene | undetectable |
| oligomers | 0.10 |
| TOTAL | 100 |

EXAMPLE 3

In a first test, a catalyst is prepared by impregnating, with a nitric solution of palladium nitrate and silver nitrate, an alumina support, in balls 2 mm in diameter, with a specific surface area equal to 10 m²/g and a total pore volume equal to 96 cm³/g so as to obtain on the finished catalyst, a content of 0.3% by weight of palladium and 0.3% of silver. After impregnation, the catalyst is dried at 120° C. in an oven and then roasted at 450° C. for two hours in an air current.

The catalyst is charged in a tube reactor then is reduced in situ according to the invention in the following way:

The catalyst is treated with an aqueous solution of formic acid; the impregnation is performed at 20° C under atmospheric pressure so that the catalyst contains 2% by weight of formic acid. The temperature of the catalyst is raised to 130° C. under a pressure of 3.5 bars and these operating conditions are maintained for two hours. Then the catalyst is dried.

The catalyst thus obtained is used in a selective hydrogenation of a diolefin.

The following operating conditions are used:
space velocity (liquid VVH) = 30
pressure = 10 bars
temperature = 40° C.
H2/butadiene = 1.8 mol/mol.

Analyses of the charge and of the product obtained are summarized in following table V:

The yield by weight of product is practically equal to 1? ? %; it is noted that practically all the butadiene is transformed. Here an excellent selectivity of the catalyst is noted since 1-butene is present in the product with a content almost equivalent to that of the charge (27.24% compared with 28%). The 1-butene yield is 27.24/28 or 97.3%, the minimum loss here of butene therefore is only 100-97.3 = 2.7%.

In a second test, the operation is as in the first test. However, the reduced catalyst, according to the invention, is prepared by performing the impregnation of the reducing agent in the presence of 3% by weight, relative to the reducing agent, of a halogen agent which is $CBr_3COOH$. The results are given in following table V.

| COMPOUND | CHARGE | PRODUCT % wt (first test) | PRODUCT % wt (second test) |
|---|---|---|---|
| 1-Butene | 28 | 27.24 | 27.35 |
| Cis 2-butene | 8 | 8.24 | 8.20 |
| Tr 2-butene | 13 | 13.42 | 13.35 |
| Butadiene | 0.3 | less than 10 ppm | less than 10 ppm |
| Isobutene | 44.2 | 44.2 | 44.2 |
| Butane | 5 | 5.4 | 5.4 |
| Isobutane | 1.5 | 1.5 | 1.5 |
| Polymers | Nothing | less than 20 ppm | less than 20 ppm |

It is observed that here the catalyst is as active as in the first test, but its selectivity is improved since the 1-butene present in the product is 27.35%. The yield of 1butene therefore is 27.35/28 or 97.68%, representing a loss of 2.32%.

EXAMPLE 4

It is proposed to sweeten a charge coming from a steam cracking of gas oil and which has the following characteristics:

| characteristics Results | Method | |
|---|---|---|
| Density at 15° C. | NF T 60-101 | 0.859 |
| Distillation ASTM °C. | NF M 07-002 | |
| Initial point | | 55 |
| 50% | | 111 |
| final point | | 180 |
| Total sulfur (ppm by weight) | NF M 07-014 | 1500 |
| Sulfur H2S (ppm by weight) | | Less than 2 |
| Mercaptan sulfur (ppm by weight) | NF M 07-031 | 70 |
| Corrosion copper plate | NF M 07-015 | 1b |
| Plumbite test (doctor test) | NF M 07-005 | positive |
| Bromine number (g Br/100 g) | NF M 07-017 | 52 |
| Maleic anhydride number (MAV) mg maleic anhydride/g | UOP 326-58 | 97 |
| Induction period (minutes) with 20 ppm by weight of antioxidant (NN'-di-sec.-butyl paraphenylene diamine) | NF M 07-012 | 20 |
| Research octane number (0.05% by weight of tetraethyl lead) | NF M 07-012 | 98 |

This gasoline is made to pass, in mixture with hydrogen, in a reactor filled exclusively with a catalyst consisting of 10% by weight of nickel deposited in a conventional way from nickel nitrate on an alumina support with 70 m²/g of specific surface area. Before use, the catalyst is roasted at 450° C. for hours then reduced in the following way in a first test:

The catalyst is treated with an aqueous solution of propionic acid; the impregnation is performed at 20° C. under atmospheric pressure, so that the catalyst contains 2% by weight of propionic acid. The temperature of the catalyst is raised to 130° C. under a pressure of 3.5 bars and these operating conditions are maintained for two hours. Then the catalyst is dried.

The reaction operating conditions are the following:
space velocity vol/vol/h: 2
average temperature °C.: 130° C.
total pressure (bars): 40
H2/charges (moles): 0.5

The product obtained after 100 hours of operation has the main characteristics given in table VI.

In a second test, the addition of propionic acid is performed in the presence of 3% by weight, relative to this acid, of a halogen additive which is CHCl$_2$COOH.

The results are given in table VI.

TABLE VI

| | | |
|---|---|---|
| Bromine number g/100 g | 43 | 43 |
| MAV mg/g (maleic anhydride number) | 10 | 10 |
| Induction period (minutes) with 20 ppm of antioxidant | 480 | 490 |
| Mercaptan sulfur (ppm by weight) | 6 | 3 |
| Total sulfur (ppm by weight) | 1500 | 1500 |
| Corrosion copper plate | 1a | 1a |
| Plumbite test | negative | negative |
| Research octane number | 98 | 98 |

It is observed that in the two tests the product is sweetened relative to the charge and responds well to the specifications required for usual motor vehicle fuels. However, an improvement is noted in the second test in comparison with the results of the first test in regard to lowering the mercaptan sulfur.

I claim:

1. In a process for selectively hydrogenating acetylenic and diolefinic hydrocarbons, comprising contacting said hydrocarbons with a catalyst and hydrogen, under hydrogenation conditions, the improvement wherein the catalyst is produced by a process comprising:

a) in a first stage, impregnating a catalyst, containing a support and an active phase with a base of at least one metal of the group VIII of the periodic table and/or at least one metal of group IB, between 0 and 50° C., with an aqueous or organic solution of a compound that is a reducing agent selected from the group consisting of aldehydes containing 2 to 14 carbon atoms per molecule, ketones or polyketones containing 1 to 18 carbon atoms per molecule and organic acids or polyacids containing 1 to 14 carbon atoms per molecule, so as to introduce 10 ppm to 100% by weight of reducing agent in the catalyst, b) in a second stage, raising the temperature of the catalyst thus impregnated to a temperature between 100 and 150° C. and under a pressure of 1 to 10 bars, whereby reduction occurs, c) in a third stage, drying the catalyst to eliminate the impregnation solvent and the water formed in step b), wherein, during the first stage, there is added to the reducing agent at least one halocarboxylic acid, in an amount of 0.1 to 10% by weight, based on halogen, relative to the weight of the reducing agent.

2. A process according to claim 11, wherein 1 to 6% by weight, based on halogen, of said halocarboxylic acid or halogen compound relative to the reducing agent is used.

3. A process according to claim 11, wherein 2 to 5% by weight, based on halogen, of said halocarboxylic acid relative to the reducing agent is used.

4. In a process for selectively hydrogenating acetylenic and diolefinic hydrocarbons, comprising contacting said hydrocarbons with a catalyst and hydrogen, under hydrogenation conditions, the improvement wherein the catalyst is produced by a process comprising:

a) in a first stage, impregnating a catalyst, containing a support and an active phase consisting of at least one metal of group VIII and/or copper and/or silver, between 0 and 50° C., with an aqueous or organic solution of a compound that is a reducing agent selected from the group consisting of aldehydes containing 2 to 14 carbon atoms per molecule, ketones or polyketones containing 1 to 18 carbon atoms per molecule and organic acids or polyacids containing 1 to 14 carbon atoms per molecule, so as to introduce 10 ppm to 100% by weight of reducing agent in the catalyst, b) in a second stage, raising the temperature of the catalyst thus impregnated to a temperature between 100 and 150° C. and under a pressure of 1 to 10 bars, whereby reduction occurs, c) in a third stage, drying the catalyst to eliminate the impregnation solvent and the water formed in step b), wherein, during the first stage, there is added to the reducing agent at least one halocarboxylic acid, in an amount of 0.1 to 10% by weight, based on halogen, relative to the weight of the reducing agent.

5. A process according to claim 4, wherein the catalyst consists of a metal of group VIII.

6. A process according to claim 4, wherein the catalyst is palladium and silver.

* * * * *